Feb. 9, 1954
H. KERSHAW ET AL
2,668,755
PLUG-TYPE CONTROL VALVE FOR FLUIDIZED
CATALYST CONVERSION SYSTEM
Filed Nov. 23, 1948
5 Sheets-Sheet 1
FIG. 1
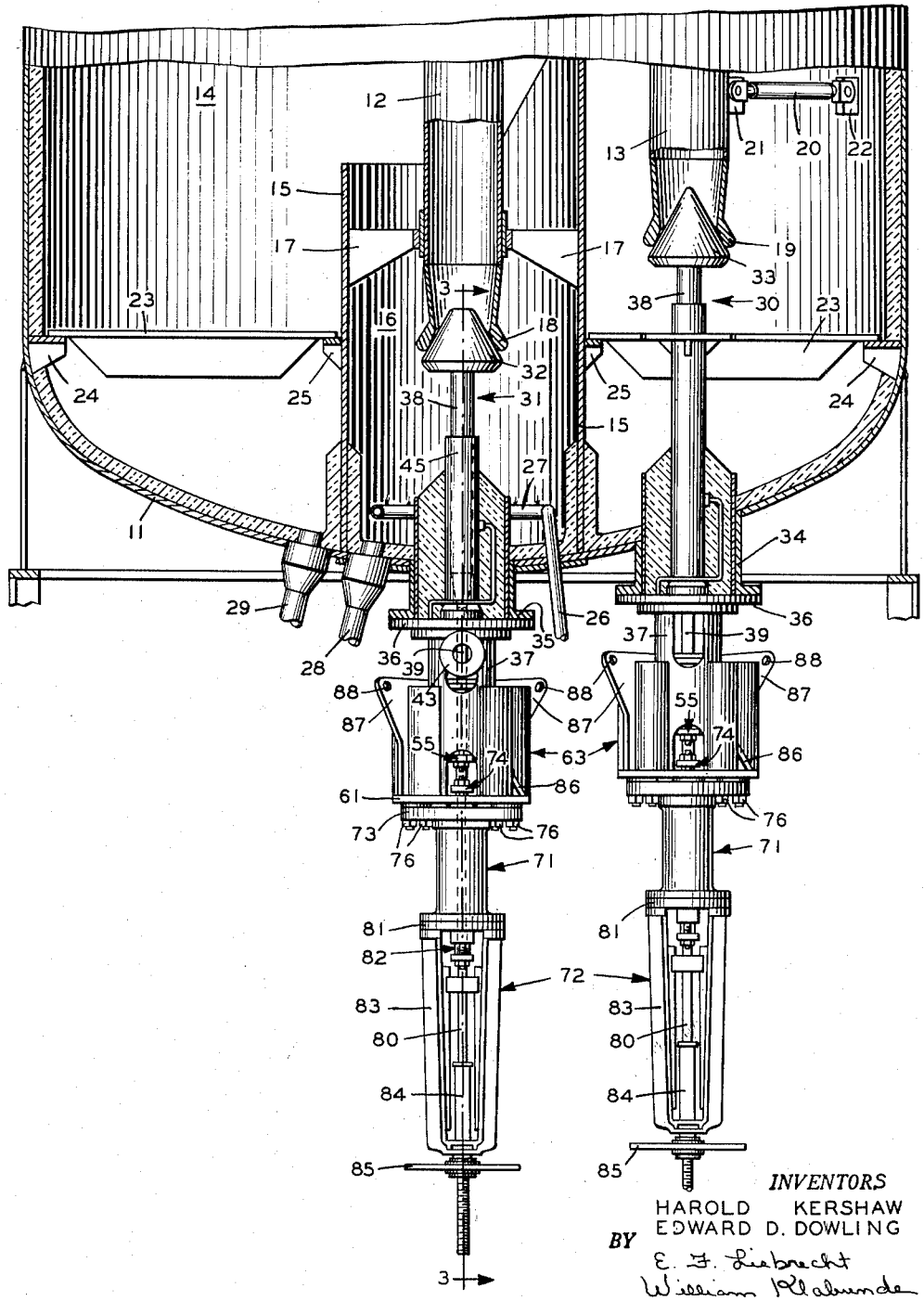
INVENTORS
HAROLD KERSHAW
EDWARD D. DOWLING
BY
ATTORNEYS

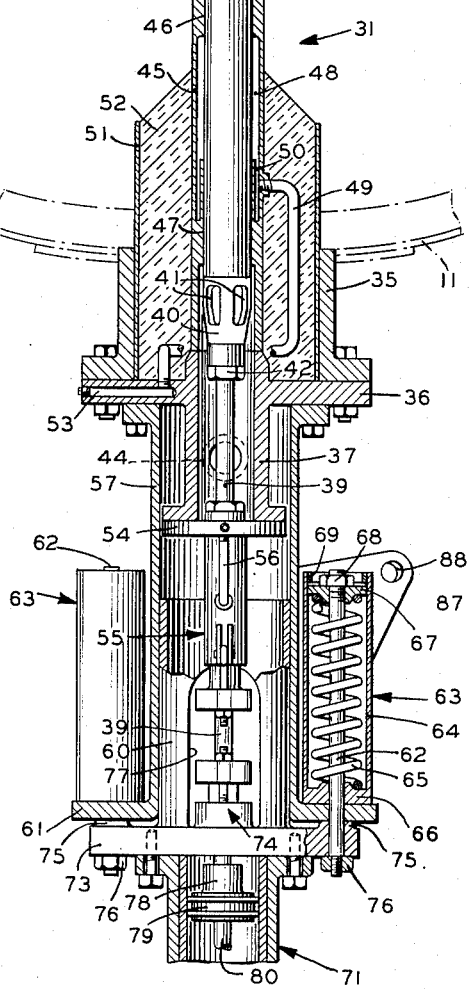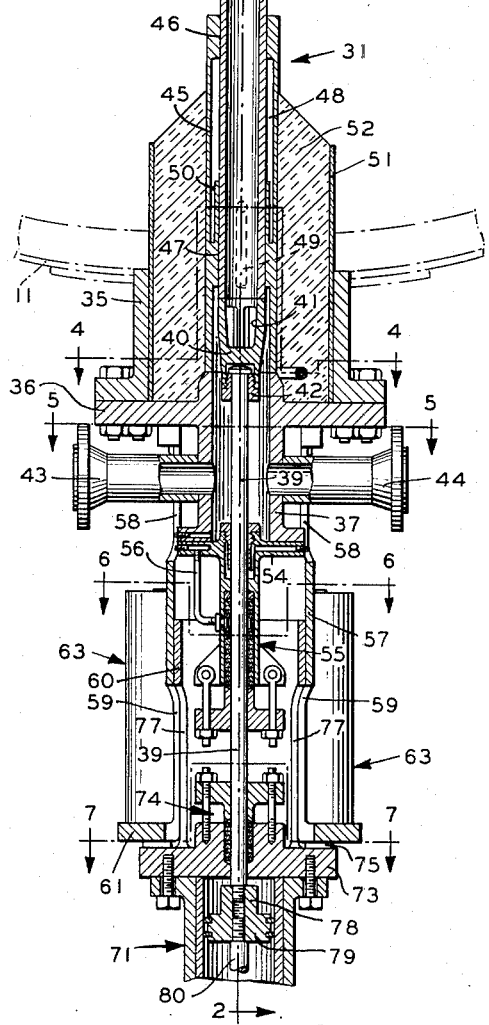

Feb. 9, 1954
H. KERSHAW ET AL
2,668,755
PLUG-TYPE CONTROL VALVE FOR FLUIDIZED
CATALYST CONVERSION SYSTEM
Filed Nov. 23, 1948
5 Sheets-Sheet 4
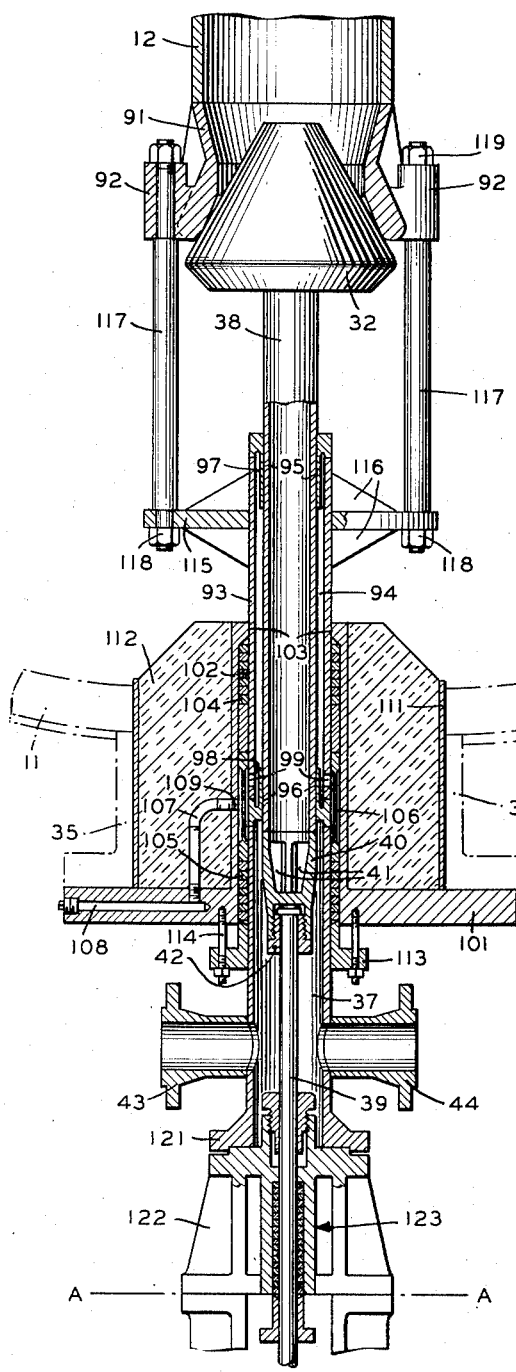
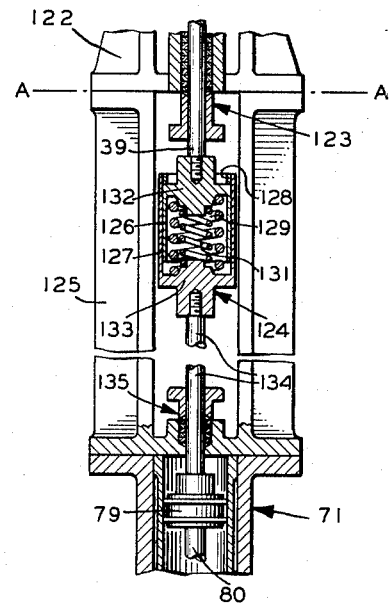
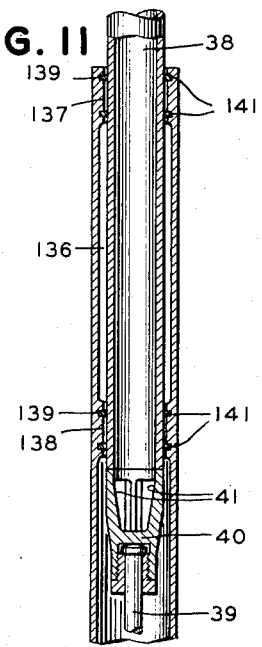
*INVENTORS*
HAROLD KERSHAW
EDWARD D. DOWLING
BY E. J. Liebrecht
William Klabunde
ATTORNEYS INVENTORS
HAROLD KERSHAW
EDWARD D. DOWLING
BY
E. F. Liebrecht
William Klabunde
ATTORNEYS Patented Feb. 9, 1954

2,668,755

UNITED STATES PATENT OFFICE 2,668,755

PLUG-TYPE CONTROL VALVE FOR FLUID-IZED CATALYST CONVERSION SYSTEM

Harold Kershaw, River Edge, N. J., and Edward D. Dowling, Queens Village, N. Y., assignors to The M. W. Kellogg Company, Jersey City, N. J., a corporation of Delaware Application November 23, 1948, Serial No. 61,622

3 Claims. (Cl. 23—288)

This invention relates to a control valve, and particularly to a plug-type control valve for controlling the flow of fluids or fluidized material through a conduit, such as the powdered catalyst transfer lines and the flue gas vent stacks employed in fluid catalytic cracking systems in the petroleum refining art.

While the invention is capable of various applications involving high temperature operations in the chemical processing and petroleum refining arts it will be referred to and explained in the following description as being particularly applied to a converter, such as a fluid catalytic cracking unit of conventional design, having superimposed contact chambers in which the catalyst is maintained in a state of phase separation comprising an upper diffuse phase and a lower dense pseudo-liquid phase, the catalyst being withdrawn from the lower dense phase of the upper chamber through a vertical internal standpipe and discharged at a low point within the dense phase of the lower chamber and, after suitable treatment in the lower chamber, being returned upwardly through an internal vertical carrier line to the dense phase of the upper chamber.

In systems of this type, a continuous cycle flow of catalyst between the chambers is obtained by passing catalyst by gravity flow from the upper chamber to the lower chamber through a standpipe and passing the catalyst from the lower chamber to the upper chamber through a carrier line by injection therein a stream of hydrocarbons, the continuous flow of the mixture upwardly through the carrier line resulting from the fact that the vaporous hydrocarbons in the presence of the hot catalyst form a mixture of lower particle concentration within the carrier line than is present in the dense bed of catalyst in the lower chamber.

Suitable flow control of catalyst from the stand-pipe into the dense phase of the lower chamber and from the latter into the carrier line for conveyance into the upper chamber is obtained by the use of plug valves engageable with the lower ends of the transfer lines and having elongated valve stems extending through the vessel wall controlled in their longitudinal movement by external mechanical or manual operating means.

Because of the extreme length of the vessels or chambers employed in carrying out such chemical conversions, the long stand-pipes and carrier lines required to transfer the catalyst from one chamber to another are subject to considerable expansion and contraction under the extreme temperatures normally employed. The problem of pipe line expansion must therefore be considered, since it is not unusual for an expansion of 3 to 4 inches to occur in the internal transfer pipe lines between the extreme position at starting up temperature and the position attained when the chamber is at the desired operating temperature.

To avoid undue stressing or buckling of the transfer lines, the vessel walls, and the valve mechanism under all conditions of operation, various expedients have heretofore been employed to permit outward movement or release of the valve when thermal expansion in the transfer line occurs while the valve member is in its closed position, as where the chamber is brought up to operating temperature conditions with the plug valves inadvertently closed or not sufficiently retracted.

The present invention is in the nature of an improvement in the plug-type valve assembly, whereby such expansion forces are permitted to be absorbed within the external valve control mechanism.

A principal object of the invention is to provide a unitary plug-type control valve for the end of a powder transfer line within a chamber, adapted to accommodate thermal expansion in the line accompanying a temperature rise while the valve is in its closed position, so constructed as to be readily removable as a single unit for replacement, inspection or repair with a minimum of dismantling operations.

Another object is to provide a unitary plug-type control valve for the end of a powder transfer line within a chamber, adapted to readily accommodate thermal expansion in the line accompanying a temperature rise while the valve is in its closed position, and having a hollow stem through which a feed stream of fluid material to be treated may be continuously injected from an external source into the end of the transfer line, the valve being so constructed that movement of the valve member between its extreme positions may be effected without causing any substantial stressing or movement of the line connections for supplying the fluid material to the hollow stem of the valve.

A further object is to provide a unitary plug-type control valve for the end of a powder transfer line within a chamber, adapted while in its closed position to accommodate thermal expansion in the line, and having a hollow stem extending through the chamber wall connected to a source of fluid material and to an external operating mechanism for controlling the movement of said valve, the construction being such as to require a minimum of effort for movement of the valve member.

Another object is to provide a unitary plug-type control valve for the end of a powder transfer line within a chamber having its body portion rigidly secured to the transfer line and extending to a point outside the chamber, and its valve member adapted to accommodate thermal expansion while in its closed position.

Still another object is to provide a unitary plug-type control valve for controlling the flow of fluid from a chamber into a conduit, in which the movable valve element is controlled externally of the chamber and is adapted to accommodate thermal expansion in the valve stem occurring while the valve is in closed position.

Other objects will be apparent from a consideration of the following description taken in connection with the accompanying drawings forming a part of this application, in which:

Fig. 1 is a fragmentary elevation, in partial section, showing the valves of the present invention applied to a chamber or vessel which may be considered to be part of a typical fluid catalytic cracking unit comprising an upper reaction chamber and a lower regeneration chamber connected by internal transfer lines terminating in the lower portion of the lower chamber, portions of the unit not directly cooperating with the valve members being omitted for the sake of clarity, since they form no part of the present invention;

Fig. 2 is an enlarged view in partial section of the center valve of Fig. 1, excluding the operating means, used in connection with the central transfer line for passing the oil feed and fresh regenerated catalyst from the lower regenerating chamber to the upper reaction chamber;

Fig. 3 is a side sectional view of Fig. 2;

Figure 8:
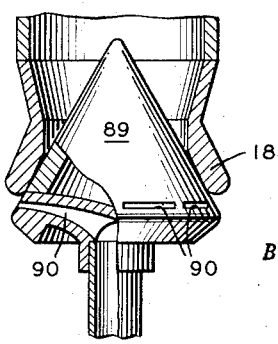
Figure 12:
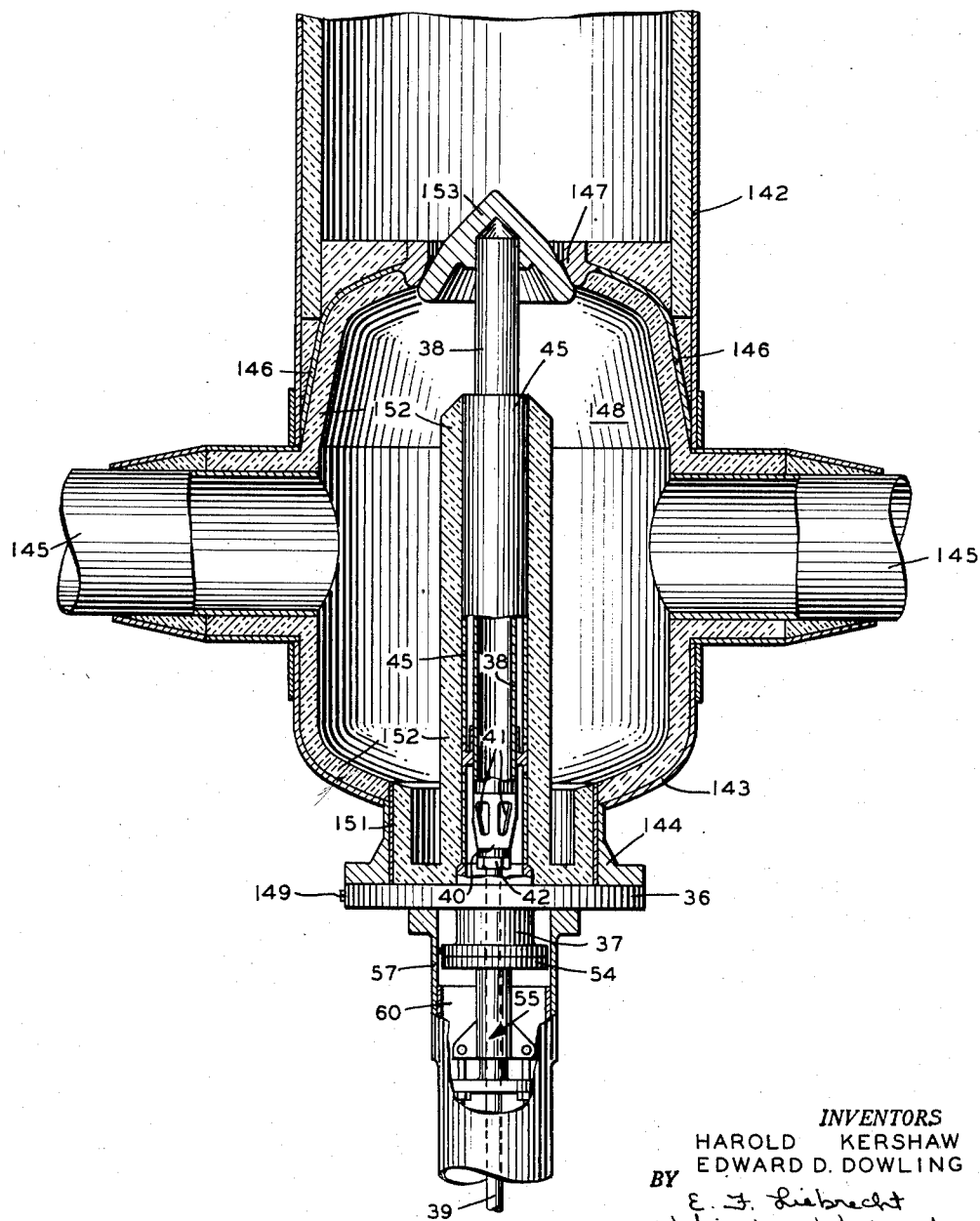

Figs. 4, 5, 6 and 7 are enlarged sectional views taken along the lines 4—4, 5—5, 6—6 and 7—7, respectively, of Fig. 3;

Fig. 8 is a sectional elevation showing a modification of the valve head;

Fig. 9 is a sectional elevation showing a modified form of the valve;

Fig. 10 is a fragmentary section of the valve mechanism of Fig. 9 immediately below the line A—A;

Fig. 11 is a sectional elevation showing a modified form of valve guide-sleeve;

Fig. 12 is a sectional elevation showing a modification of the valve adapting it for use in controlling the discharge of flue gas through a vent stack.

Referring to Fig. 1 of the drawings there is shown in fragmentary section the lower portion of a chamber 11, which may be the lower of two separate superimposed vessels or the lower subdivision of a single vessel suitable partitioned to form upper and lower chambers, such as that disclosed in U. S. patent application Serial No. 724,956, filed January 29, 1948. For the purposes of illustrating an application of the present invention it may be assumed that the chamber 11 represents the lower regeneration chamber of a fluid catalytic cracking unit having a superimposed reaction chamber, as shown in the above-mentioned pending application. Vertical conduits 12 and 13 serve as lines of communication between a dense fluidized mass of catalyst maintained in the bottom of the upper reaction chamber and a similar mass 14 maintained in the lower portion of the regeneration chamber. Conduit 12 is a carrier line for conveying fresh regenerated catalyst from the dense fluidized catalyst mass 14 maintained in the lower portion of the chamber 11 upwardly into the reaction chamber above, and conduit 13 is a stand-pipe for withdrawing spent catalyst from the dense bed maintained in the lower portion of the upper reaction chamber and discharging it into the catalyst bed or dense phase 14 of the regenerator.

Since a superimposed arrangement of reaction and regeneration chambers in a fluid catalytic conversion unit is well known, a fuller illustration and description is not believed necessary for a complete understanding of the present invention.

The carrier line 12 and the stand-pipe 13 are elongated conduits extending upwardly through the regeneration zone in chamber 11 and are, therefore, subject to considerable expansion and contraction between the extremes of temperature obtained when the regenerator is brought from a cold condition up to operating temperature conditions which may be in the order of about 1000 to 1100° F.

A cylindrical member 15 centrally positioned in the bottom of the chamber 11 forms a well 16 into which the lower end of the regenerated catalyst carrier line 12 extends. Suitable guide members 17 attached to the inner wall of the cylinder 15 serve to maintain the lower end of the carrier line 12 centrally positioned within the well without restricting its free longitudinal movement by reason of expansion or contraction as a result of temperature changes within the regenerator. The lower end of carrier line 12 is provided with an outwardly flared mouth portion 18, the inner surface of which provides a seat for a plug-type valve.

The lower end of stand-pipe 13 terminates below the upper edge of the cylinder 15 in the annular space surrounding the well 16, and is similarly provided with an outwardly flared mouth portion 19 for the reception of a plug-type valve. Guide struts 20 pivotally attached at their ends to lugs 21 and 22 secured, respectively, to the outer surface of the stand-pipe 13 and the inner wall surface of the chamber 11 serve to maintain the lower end of the stand-pipe 13 in axial alignment with the plug valve under all temperature conditions.

In the lower portion of chamber 11 a horizontal annular grid 23 is provided, suitably supported by a ring 24 attached to the chamber wall and a ring 25 attached to the outer surface of the cylinder 15, to support the dense phase mass of regenerated catalyst. A steam inlet 26 extends through the lower wall of the chamber 11 into the well and is connected at its inner end to a pipe distributor ring 27 from which steam is introduced into the well 16 to pass upwardly through the mass of catalyst descending into the well from the dense bed 14 of the regenerator for subsequent passage into the lower end of the carrier line 12. The customary drop-out outlets 28 and 29 are provided in the bottom wall of the chamber, through which the well and the annular space around the well and below the grid may be drained.

To control the flow of spent catalyst into chamber 11 through stand-pipe 13, and out of the chamber after suitable regeneration through carrier line 12, plug-type valves 30 and 31, respectively, are provided. Valves 30 and 31 may be of substantially identical construction, except for slight modifications adapting the valve for its intended service. In its principal application, the valve is intended for fluid injection into a powder transfer line concomitantly with flow control of the powder into the same, as exemplified by the internal catalyst carrier line 12 for conveying catalyst withdrawn from the lower regeneration chamber 11, in admixture with vaporous hydrocarbons injected through hollow injector head 32 directly into the carrier line, to an upper reaction chamber, the catalyst being transferred continuously between dense fluidized masses in the lower portions of the chambers. The valve is equally suitable, however, with only slight modification for use in controlling the transfer of catalyst through a stand-pipe from an upper regeneration chamber to a lower reaction chamber concomitantly with injection of hydrocarbon feed into the latter. The valve head in such case is modified as shown in Fig. 8, so that the hydrocarbons may be continuously injected directly into the reaction chamber adjacent the point of introduction of regenerated catalyst. Valve 30 controls the flow of spent catalyst through the stand-pipe 13 connecting an upper reaction chamber with the lower regeneration chamber 11. The valve 30, however, is modified by substituting a solid plug head 33 for the hollow injector head 32, and by eliminating or blocking off the inlet nozzles which supply to the bonnet of the valve the fluid to be injected into the transfer line. If it is desired, however, to provide aeration gas to the stand-pipe 13, the hollow type injector head and the inlet nozzles may be retained to supply gas, such as steam, to the stand-pipe. Regardless of whether the valve is to be used for carrier line control or for stand-pipe control, or whether the valve is to be used as a combined plug valve and injector or solely as a plug valve, the basic construction illustrated in the drawings may be used. The slight changes necessary to adapt the basic valve structure for its particular use may readily be made at the place of manufacture or in the field with a minimum of cost, materials, and labor.

As a safety precaution to avoid injury to transfer lines 12 and 13 in the event that valves 30 and 31 are left in closed position while the temperature of the unit is substantially increased, as in starting up from cold condition, means are provided in conjunction with the external valve control mechanism to accommodate or relieve the severe stresses transmitted to the valve stems from the expanding transfer lines, and incidental stresses transmitted to the valve assembly as a result of expansion of the valve stem.

Valves 30 and 31 are unitary assemblies projecting through the bottom of the chamber 11 in axial alignment with their respective catalyst transfer lines 13 and 12, and are removably attached to the chamber wall so that they may readily be removed as a unit. For this purpose, flanged mounting nozzles 34 and 35 are provided in the bottom of the chamber 11 to receive the valve units 30 and 31, respectively. The entire valve mechanism is supported from nozzles 34 and 35 by the flange 36 of valve bonnet 37 forming a closure for the end of the mounting nozzle and being removably secured thereto in any conventional manner.

The valve assembly 31, shown in enlarged section in Figs. 2 to 7, comprises an elongated valve stem consisting of a tubular portion 38, having the injector head 32 secured to its upper end engageable with the mouth portion 18 of the carrier line, and a solid rod portion 39 connected to the lower end of the tubular section 38 through a spider 40 having openings 41 which provide free access to the hollow portion 38 of the valve stem. Spider 40 is secured, as by welding, to the lower end of hollow portion 38, and is removably joined to the upper end of solid portion 39 by the screw collar 42 threaded into the lower end of the spider. Bonnet 37 forms a chamber into which the oil feed and, if desired, a steam and slurry mixture may be introduced through diametrically opposite inlet nozzles 43 and 44 set in the sides of the bonnet.

The upper end of bonnet 37 is extended to form a cylindrical valve guide sleeve 45 projecting upwardly into the chamber 11 to a point adjacent the lowermost position of the valve head 32 when the valve is fully retracted. Upper and lower guiding and sealing surfaces 46 and 47 are provided on the inner wall of the valve guide sleeve 45 separated by an annular space 48 between the guide sleeve and the hollow valve stem into which bleed steam may be introduced by steam line 49, the arrangement of which is clearly shown in Fig. 4. The lower guide portion 47 is undercut a substantial distance from its upper end to provide an annular space 50 into which bleed steam may be introduced through line 49 without direct impingement on the hollow valve stem 38.

The portion of valve guide sleeve 45 below the surface 47 forms with the bonnet 37 a continuous chamber within which the portion of the valve stem including the spider 40 moves up and down between its upper and lower limits. Constant open communication for any position of the valve stem is thus provided between the hollow portion 38 of the valve stem and the bonnet 37 into which the oil feed is introduced through inlets 43 and 44.

A particular advantage of the arrangement thus far described is that the nozzles 43 and 44, connectable with external feed lines, not shown, are at all times in fixed position regardless of any movement of the valve stem, thus eliminating the need for the usual flexible coupling arrangements between the valve and the oil feed lines.

The valve guide sleeve portion 45 of the bonnet 37 extending upwardly from the flange 36 is provided with a cylindrical insulation casing 51 secured at its lower end to the upper face of the flange 36. The annular space between the casing 51 and the valve guide sleeve 45 is filled with a suitable insulation material 52, such as mineral wool cement. Embedded within the insulation material 51 is the steam bleed line 49, which extends downwardly through the insulation material and partially encircles the valve guide sleeve before communicating with a radial inlet port 53 formed in the flange 36. The insulation material may suitably be applied to the valve unit at the point of manufacture.

At the lower end of bonnet 37 a cover plate 54 is provided to seal the bonnet chamber. A conventional packing gland 55 is provided in cover plate 54 to receive the solid portion 39 of the valve stem. A suitable lubricant line is provided in the usual manner, as at 56, to lubricate the packed portion of the gland.

Figure 4:
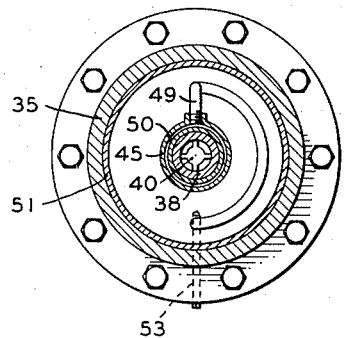
Figure 5:
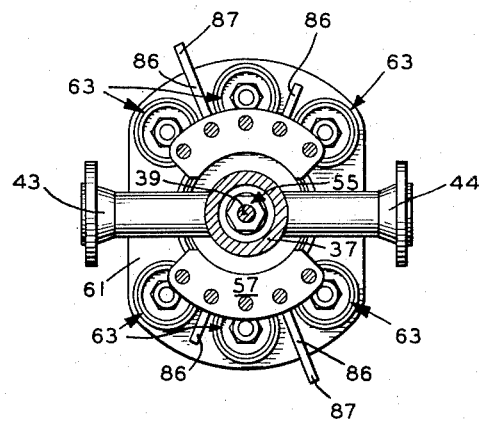
Figure 6:
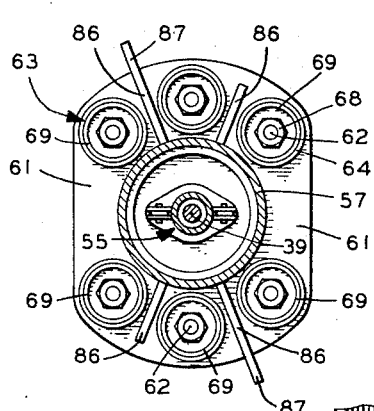
Figure 7:
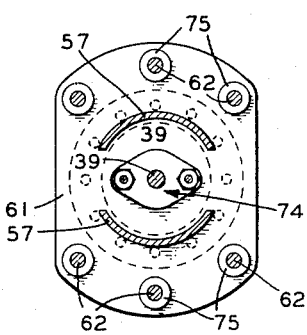

A support member, conveniently formed as a flanged cylinder 57 having cut out portions 58 and 59 at each end, is removably attached to the underside of the bonnet flange 36, encircling the bonnet 37 and the portion of the valve stem projecting downwardly through cover plate 54. The flanged nozzles forming the feed inlets 43 and 44 of the bonnet 37 extend outwardly through the openings 58 in the upper end of the cylinder 57. The openings 59 in the lower end of cylinder 57 permit free access to the packed gland 55 set in the cover plate 54 and receiving the solid portion 39 of the valve stem. The lower end of cylinder 57 is provided with an extended flange 61 having a series of openings to receive downwardly projecting spring bolts 62 of a series of preloaded spring assemblies, generally indicated by the numeral 63, distributed about the upper surface of the flange 61, as shown in Fig. 6. The spring assemblies 63 may be separately constructed as preloaded units, each comprising a cylindrical casing 64 containing a coil spring 65 surrounding the spring bolt 62, which is threaded at both ends. The spring 65 is held under compression between the lower end 66 of the casing 64 and an upper spring washer 67. Upper washer 67 is restrained from upward movement by the ring 69 attached, as by welding, in the upper end of casing 64. Spring bolt 62 is threaded at both ends, the lower threaded portion being of slightly reduced diameter to provide a shoulder. A nut 68 on the upper end of the spring bolt is adjusted to provide a desired amount of extension of the bolt from the lower end of the spring assembly. Each spring assembly is adjusted so that the shoulder portions at the lower threaded ends of the spring bolts are uniformly spaced from the lower end of the spring casing. When the desired adjustment of nuts 68 has been made, each nut may be tack-welded to its spring washer 67. The reason for uniform extension of the lower ends of the spring bolts will be explained hereinafter in connection with the attachment of the valve structure to the operating devices.

With the exception of the movable valve stem, the structure thus far described is rigidly supported from the flanged nozzle 35 of chamber 11 through the bonnet flange 36, and the valve stem formed by connected portions 38 and 39 is free to move toward or away from its seat on the end 18 of the carrier line 12 through the packed joint 55, which prevents leakage of fluid from the bonnet chamber. The lower end of solid portion 39 of the valve stem extends below the flange 61 and is adapted for attachment to a commercial valve operator. The valve operator may be of any suitable type, preferably including a combination of manual and mechanical operating means, such as a conventional hydraulic cylinder working in conjunction with a manual operator. Since conventional means are employed for the operation of the valve, a detailed description of their construction is not believed necessary for a complete understanding of the invention. The combination of an hydraulic cylinder, generally indicated by the numeral 71, and a manual operator, generally indicated by the numeral 72, is shown in elevation in Fig. 1. Figs. 2 and 3 show in section only such portions of a conventional hydraulic cylinder as would require modification in order to adapt it for connection with the preloaded spring assembly. The operation and construction of hydraulic cylinders for such use being well known, the usual feed lines and valves ordinarily associated with the hydraulic cylinder have been eliminated for the sake of simplicity.

A modified cylinder cap 73 is provided at the flanged upper end of the cylinder body of hydraulic cylinder 71 through which the lower end of the solid portion 39 of the valve stem projects into the interior of the cylinder. A fluidtight connection is provided between the cylinder cap and the valve stem by a conventional packing gland 74. Cylinder cap 73 is provided with a series of openings through which the lower ends of spring bolts 62 may extend.

Bosses 75 are provided on the upper surface of the cylinder cap 73 around the spring bolt openings to provide breakaway contact surfaces, normally held against the under side of the flange 61 by the spring assembly. Slightly less than the full length of the lower threaded portion of spring bolts 62 is permitted to extend through the openings in the cylinder cap 73. Nuts 76 on the lower ends of spring bolts 62 secure the cylinder cap 73 to the flange 61. The spring bolt nuts 76 are advanced on the lower threaded portions of the spring bolts sufficiently to contact the shoulders and to transfer the spring load from the spring stop rings 69 in the upper ends of the spring casings to the spring bolts through the spring washers 67, retained by the nuts 68 on the upper ends of the spring bolts.

To maintain constant axial alignment between the valve mechanism and the valve operator mechanism, guide means is provided between the cylindrical support member 57 and the hydraulic cylinder cap 73. For this purpose, a cylindrical member 60 may be attached at its lower end to the upper surface of the cylinder cap 73 and extend telescopically within the cylinder 57. Openings 77 are provided in the lower portion of the cylindrical member 60 to normally align with the openings 58 in the lower portion of the cylinder 57, thus permitting ready access to the packing glands 55 and 74.

The lower end of solid valve stem portion 39 terminates within the hydraulic cylinder 71 and is threaded into the connector extension 78 of the piston 79. The piston 79 of the hydraulic cylinder is attached by a threaded connection to the upper end of the stem 80 of manual operator 72, which extends upwardly into the hydraulic cylinder through lower cylinder cap 81, provided also with a packing gland 82.

The lower end of operator stem 80 extends downwardly through the yoke 83 of the manual operator and is threaded at its lower end to receive the yoke sleeve 84 mounted for free rotational and limited longitudinal movement in the lower end of the yoke, and operated by the handwheel 85. The free longitudinal movement of the yoke sleeve 84 corresponds to the stroke of the cylinder piston 79.

In normal operation, the valve stem is actuated along its longitudinal path of movement toward or away from its seat on the lower end of the transfer line by movement of the piston 79 within the hydraulic cylinder 71 in response to pressure changes within the hydraulic cylinder on either side of the piston controlled through the usual instruments associated with hydraulic valves, not shown.

When hydraulic operation of the valve is for any reason impossible, or when it is desired to manually change the position of the valve, the hand-wheel 85 may be rotated until either end of the yoke sleeve 84, dependent upon the direction of rotation, is brought into contact with the end of the yoke. Further rotation of the yoke sleeve will then cause the stem 80 and its associated portions 38 and 39 to be moved longitudinally to open or close the valve 32. Free movement of the piston 79 within the hydraulic cylinder, during manual operation of the valve, is obtained by by-passing the fluid oil of the hydraulic cylinder to equalize the pressure on either side of the piston, so that movement of the piston merely causes the oil to pass from one end of the cylinder to the other. Such by-passing may be effected through the conventional control instruments, not shown, associated with the hydraulic cylinder.

While the valve mechanism has been shown as being operated through a combination hydraulic and manual operator, it is obvious that various other means for positively actuating the valve stem may be employed. When a combination motor-driven and hand-operated device is to be used for actuating the valve stem, the cylinder cap 73 and its associated packing gland 74 may be replaced with a suitable mounting plate, through which the lower end of valve stem portion 39 may freely pass and be connected at its lower end to the actuating means. In any case, however, the operating mechanism is suspended from the spring bolts 62 and the cylinder cap 73, or mounting flange, as the case may be, is normally held in contact with the flange 61.

For all normal operation of the valve, the entire assembly remains as a single rigid unit, from the upper end of the guide sleeve 45 to the lower end of the yoke 83 of the manual operator, and the valve stem, including the hollow portion 38, the solid portion 39, and the operator stem 80, which forms a continuation of the valve stem, is movable along a path in axial alignment with the carrier line 12. The breakaway connection between the flange 61 and the cylinder cap 73 is provided primarily as a safeguard against injury to the carrier line, the chamber walls or the valve mechanism when the temperature within the chamber 11 is raised sufficiently to cause a substantial expansion in the carrier line while the valve head 32 is in closed position against its seat 18. In such event, the expansion forces exerted by the carrier line tend to force the valve downwardly. If, at the time, the valve is under hydraulic operation, the piston 79 resists such movement and the entire operating mechanism, as a unit, is forced downwardly against the action of the springs 65 of the spring assembly. This causes a breakaway between the flange 61 and the cylinder cap 73, the latter moving downwardly a distance equal to the longitudinal expansion of the carrier line and the valve stem. When the valve is under manual operation, at which time piston 79 is free to move within the hydraulic cylinder, a breakaway between the valve mechanism and the operating mechanism will depend upon the position of the yoke sleeve 84. Since the yoke sleeve 84 is free to move longitudinally within the bearing at the end of the yoke 83, the valve stem will move freely downward, carrying the yoke sleeve with it, until the latter is in its lower limiting position. Further movement of the valve stem will then cause a breakaway between the valve structure and its operating mechanism.

As previously mentioned, an advantageous feature of the valve is that it may be removed as a unitary structure from the chamber wall by simply removing the bolts or other connectors joining the flange 36 to the flanged nozzle 35. Since such valves are of considerable size and weight, and are consequently costly, the problem of removal without injury to the valve is important. To facilitate such removal, two of the four reinforcing webs 86 attached, as by welding, to the cylinder 57 and to the flange 61 between the spring casing members 64 are provided with extensions 87 at their upper ends to form lugs having openings 88 to which a suitable hoisting apparatus, not shown, may be attached.

It has been assumed, for the purpose of demonstrating a typical application of the present invention, that the hollow valve is employed in connection with the lower end of a carrier line for transferring catalyst from a lower regeneration zone to an upper reaction zone by injecting the hydrocarbon oil feed from the hollow tip of the valve into the carrier line. The valve, however, is also adapted for use in systems where catalyst is to be conveyed from an upper regeneration zone into a lower reaction zone through a stand-pipe. In such application, a valve head constructed as shown in Fig. 8 may be attached to the upper end of the hollow portion 38 of the valve-stem to control the flow of regenerated catalyst from the stand-pipe into the reaction zone, while continuously injecting a hydrocarbon feed stream through the head of the valve into the reaction zone at a point adjacent the lower end of the stand-pipe. Referring to Fig. 8, a modified valve head 89 having a solid plug tip and side ports 90 is attached to the upper end of the hollow portion 37 of the valve stem. Constant open communication between the valve stem and the reaction zone is thus provided regardless of the position of the valve. The descending stream of fresh regenerated catalyst emerging from the lower end of the stand-pipe when the plug head is retracted merges with the hydrocarbon feed stream discharging laterally from the valve head through ports 90 to provide rapid and efficient intermixing of the catalyst and the oil.

Figs. 9 and 10 show a modification of the invention in which the body of the valve is removably secured to the lower end of the carrier line 12, so that any longitudinal movement of the carrier line as a result of expansion or contraction will cause a corresponding movement of the valve structure as a whole inwardly or outwardly with respect to the vessel wall. A suitable stuffing-box or packing gland arrangement is provided between the body of the valve and the chamber 11 to adequately seal the joint while permitting longitudinal movement of the entire valve unit, as clearly shown in Fig. 9. In the illustration of the modification, reference numerals used in connection with Figs. 1 to 7 will be repeated to designate similar parts.

Referring to Fig. 9, the valve stem of Fig. 2, consisting of the injector head 32, hollow portion 38 and solid portion 39 connected thereto by spider 40 is shown in closed position against the lower end of carrier line 12. A modified mouth portion 91, having a series of lugs 92 distributed about the outer perimeter is used in place of the flared mouth portion 18 to provide a seat for the valve head 32 and means for securing the valve unit to the carrier line.

The cylindrical bonnet 37 having fluid inlets 43 and 44 adjacent its lower flanged end is provided with a modified valve guide sleeve 93 at its upper end to guide in free longitudinal movement the hollow portion 38 of the valve stem. Valve guide sleeve 93 is substantially greater in diameter than hollow valve stem portion 38, so that an annular space 94 is provided for the circulation of bleed steam. Upper and lower contact surfaces 95 and 96 are provided in each end of guide sleeve 93, each being undercut for the major portion of its length to form annular spaces 97 and 98, respectively, communicating with the annular space 94. Ports 99 are provided in the wall of guide sleeve 93 adjacent lower annular space 98, so that bleed steam may be introduced therein without direct impingement on the valve stem. Lower contact surface 96 maintains contact with the lower end of hollow valve stem portion 38 above the spider 40 when the valve is moved to its closed position, so that the remaining portion of bonnet 37 forms a chamber within which the spider portion 40 moves up and down for the full length of the valve stroke, constant open communication being at all times provided between the bonnet chamber and the openings 41 in the spider.

The bonnet 37 and its upper valve guide extension 93 presents a continuous outer cylindrical surface extending into the chamber 11 through the flanged nozzle 35 provided in the wall of the chamber 11 in axial alignment with the valve stem and the transfer line 12. A cover plate 101, having a central opening to receive the upper end of the bonnet, is removably secured to the nozzle 35. A cylindrical neck 102 formed about the perimeter of the central opening in plate 101 extends upwardly from the plate through the nozzle 35 into the chamber 11 to form a stuffing-box through which the cylindrical body formed by the bonnet 37 and its guide sleeve extension 93 may slide longitudinally while a constant fluid-tight seal is maintained. The upper end of neck 102 is increased in wall thickness for a short distance to provide a base for the stuffing-box and a contact surface 103 for guiding the valve guide sleeve 93.

The elongated stuffing-box formed by the annular space between the cylindrical member 102 and the surface of bonnet 37, including its extension 93, is provided with suitable packing material 104 and 105 at each end, separated by a lantern gland 106. The ports 99 provided in the wall of the member 93 communicate with the space occupied by the lantern gland 106 at all times. A line 107 conveys bleed steam from an inlet port 108 formed in the cover plate 101 to the space occupied by the lantern gland 106 through an opening 109 formed in the wall of the cylinder 102. Lantern gland 106 is of open-work construction, to permit free passage of the bleed steam through the lantern member and the valve guide sleeve ports 99 to annular space 94.

Nozzle 35 is of substantially greater diameter than stuffing-box neck 102 to provide an annular space to receive suitable insulation material. For this purpose, a cylindrical casing 111 is attached along its lower circumference to the cover plate 101 and extends upwardly through the nozzle 35 and the wall of the chamber 11. The casing 111 is of as large a diameter as may be freely received within the opening of the nozzle 35. Suitable insulation material 112 is packed between the casing 111 and the cylinder 102, within which the bleed steam line 107 is completely embedded. The stuffing-box is provided with a conventional gland 113 attached to the cover plate 101 by stud bolts 114.

On the upper end of valve guide sleeve 93 is a flange member 115, rigidly secured to the guide sleeve and reinforced by braces or webs 116. Tie-bolts 117 extend through aligned bolt holes in the flange 115 and in the lug members 92 formed on the perimeter of the mouth portion 91 of the transfer line 12. The threaded portions at the ends of tie-bolts 117 are of reduced diameter to provide shoulders held against the flange 115 and the lugs 92 by nuts 118 and 119, respectively, on the threaded portions of the tie-bolts. The coupling arrangement between the lower end of the carrier line 12 and the valve is, therefore, such that the valve moves as a unit with the carrier line during movement of the latter in either direction.

A breakaway joint as provided in the illustration of Figs. 2 and 3 is not required in the modification of Figs. 9 and 10 since the entire valve structure in the latter illustration moves longitudinally through a stuffing-box in the cover plate 101 upon expansion or contraction of the carrier line 12. The hydraulic and manual operators may therefore be rigidly attached to the body of the valve through the flange 121 on the lower end of bonnet 37. A cover member 122 attached to flange 121 and having conventional stuffing-box arrangements 123 seals the lower end of the bonnet 37.

While the modification of Figs. 9 and 10 eliminates the need for a breakaway between the body of the valve and its operator as a result of carrier line expansion, there is still to be considered the matter of valve stem expansion and the stresses created in the valve stem when the valve is left closed during a substantial temperature rise. To relieve the stresses in the valve stem, a spring-loaded connector 124 is provided between the lower end of valve stem portion 39, extending below packing gland 123 is member 122, and the valve operating mechanism. Spring-loaded connecter 124 is situated within an elongated spacing member 125 attached at its upper end to the bonnet cover member 122 and, in turn, forming at its lower end a cylinder cap for the hydraulic cylinder 71. Spring connecter 124 comprises inner and outer telescoping members 126 and 127, respectively, normally held in extended position against an internal stop ring 128, secured, as by welding, in the outer end of the member 127, by the action of a pair of compressed coil springs 129 and 131 concentrically arranged within the inner telescoping member 126. The upper closed end 132 of member 126 is connected to the lower threaded end of valve stem portion 39, and the lower closed end 133 of member 127 is connected to the upper threaded end of a stem portion 134, the lower end of which passes through a packing gland 135 in the base of spacing member 125 into the hydraulic cylinder 71 where it is connected to the piston 79 attached to the upper end of stem 80. Expansion of the valve stem is accommodated by the compression of springs 129 and 131, thus avoiding injury to the valve mechanism.

The provisions for expansion provided in the valve of Figs. 2 to 7 differ from those provided in the modified valve structure of Figs. 9 and 10. Whereas in the former, the body of the valve remains fixed with respect to the chamber while the valve stem and the operating mechanism rigidly connected therewith yield to the expansion forces applied at the end of the closure member against the action of the spring assembly, in the latter the body of the valve remains fixed with respect to the end of the expandible carrier line and moves as a unit therewith, while the valve stem is rendered axially compressible by inserting a resilient connecter in an intermediate portion of the valve stem.

While it may seem that the modification of Figs. 9 and 10 is not strictly in keeping with the recited objectives of permitting a minimum of movement of the feed line connections leading to the valve, and of requiring a minimum power consumption for operation of the valve mechanism, it is to be noted that there is no material deviation from these objectives in the modified construction. In either case, the force required to operate the valve stem is maintained at a minimum by having those portions of the valve stem frictionally engaged within the stuffing-boxes at the lower end of the valve bonnet and at either end of the hydraulic cylinder of a minimum circumference. This is accomplished by providing a solid rod 39 of reduced diameter for the lower portion of the valve stem. In the modification of Fig. 9, however, the guide sleeve portion of the valve body moves within the stuffing-box formed by the cylinder 102. Such movement is readily accomplished by the thermal expansion forces in the carrier line, which are easily sufficient for this purpose. Furthermore, fluid inlet connecters 43 and 44 move up and down with movement of the valve body. Such movement, however, is not in excess of the maximum possible expansion of the carrier line, which is normally not more than about three or four inches. Standard line connections are capable of accommodating this amount of expansion.

Fig. 11 shows a modification of the valve guide sleeve in which the steam bleed line for introducing steam into the annular space between the hollow portion 38 of the valve stem and the annular space 136 formed between the guide surfaces 137 and 138. Grooves 139 formed in the guide surfaces 137 and 138 are provided with piston rings 141 which are expanded to encircle the hollow valve stem and provide an effective seal against the passage of catalyst from the chamber 11 or oil from the bonnet 37.

In addition to the advantageous application of the valve of the present invention to the control of catalyst flow in the transfer lines of fluid catalytic conversion systems, we have found the valve to be suitably adapted also for the control of flue gas discharging from a conversion system through a vent or stack.

It is the usual practice in such systems to locate the flue gas control valves in the base of a stack which vents to the atmosphere the gases discharging from the outlet an electrical dust precipitator or from cyclone separators located within the regenerator. The valve or valves control the flow of dust laden flue gases by selectively reducing or enlarging the area through which the gases flow, and are usually actuated in response to pressure regulating instruments, not shown.

Heretofore, the valves employed for this purpose have generally been one of the following types: the "butterfly" vane type, similar to the common stove-pipe damper; the slide valve, comprising a plate or disc sliding across a more or less central opening; and a double disc slide valve, comprising two horizontally placed flat plates sliding across a central opening in such a manner as to keep the flow substantially central with respect to the conduit.

Experience has shown that the catalyst powder in concentrations usually found in such flue gas streams does not produce serious erosion unless high velocities are employed, and then, primarily at the points of stream deflection. Such conditions are obviously at their maximum within the restricted valve port openings and immediately downstream therefrom. For this reason, the valve parts in such areas are usually of reinforced thickness or of a material especially resistant to such erosion, in order to afford maximum life.

Referring to Fig. 12, the valve is shown at the lower end of a stack, which may be assumed to be the stack of a fluid catalytic cracking unit mounted adjacent the regenerator and receiving streams of flue gas therefrom through side inlets. Only a fragmentary portion of the stack and its connections with the regenerator have been shown, since further illustration is not believed essential for an understanding of the invention.

The lower end of vertical stack 142 is provided with a cover plate or head 143 having a central connector 144 and diametrically opposite inlets 145, connected as above mentioned to the regenerator.

The stack is partitioned immediately above the flue gas inlets 145 by the inverted semi-ellipsoidal member 146 having a central opening provided with a relatively thick valve-seat ring 147. The space between the lower end of the stack and the partition member 146 forms a chamber 148 wherein the velocity head of the gas streams introduced through inlets 145 is substantially diminished before the streams pass upward into the stack proper through the opening formed by the seat ring 147.

The valve stem is constructed as shown in Fig. 3, comprising a hollow upper portion 38 and a solid lower portion 39, connected by the spider 40. The valve bonnet 37 is removably connected through its upper flange 36 to the connector 144. The bonnet is modified, however, to the extent of eliminating or blocking off the bonnet inlets 43 and 44 and of replacing the bleed steam port 53, extending radially partially through the flange 36, with a port 149 communicating directly with the bonnet chamber. A further modification is made by replacing insulation casing 51 with a shorter cylindrical member 151 extending into the chamber 148 a distance about equal to the thickness of insulation material 152 applied to the walls of the chamber 148 and the outer surface of the valve guide sleeve 45.

The valve member is provided with a plug-type head 153 seating against the ring 147, and is operated axially to move the head toward or away from its seat by suitable operating devices, such as those shown in Fig. 1. A breakaway connection, such as that illustrated in Figs. 2 and 3, may be provided to accommodate expansion of the valve stem. Or, a spring connection, such as that shown in Fig. 10 may be employed, since the major expansion forces to be contended with arise through the differential expansion between the valve stem and the member 146. In either case, the amount of movement to be allowed for in the spring connection is relatively small.

The use of the present valve for flue gas control in the manner illustrated has several advantages not found in the valves usually employed in such connection. For one thing there is a constant concentricity of the flue gas stream with respect to the conduit or stack at all times, thus preventing impingement of the high velocity stream as it emerges from the valve port upon the walls of the conduit or upon other valve parts. Another advantage is in the lessening of the probability of erosion of the valve itself, since direction changes of the flue gas stream are kept to a minimum, and such wear as does inevitably occur is distributed equally around the periphery of the plug and its seat. Any wear in the plug or the seat may be compensated for by providing an increased operating stroke for the valve stem, thus permitting the plug to be advanced into the opening as wear takes place. Wear upstream of the valve is not expected to be serious since velocities are relatively lower. Other advantages are to be found in the ease of installation, and removal, since the valve is supported as a unit in the lower connector or nozzle by a single bolted flange connection, the lower costs of fabrication, and the savings in material and labor by the elimination of the supports usually required to support the overhang of the valve operator when the valves are arranged in horizontal position.

By reason of the improvements of the present invention, it has been possible to obviate many of the disadvantages present in devices commonly employed for the purpose of controlling catalyst flow into or out of internal transfer lines, and for controlling flue gas flow through a stack. By our invention we have been able to eliminate the elaborate and costly expansion devices normally required for carrier lines of any considerable length, and to minimize the flexible coupling arrangements normally required in the oil inlet connections when the control valve is permitted to move under the expansion forces exerted by the transfer lines. A further advantage in the construction of the present invention is the considerable saving in energy required to operate the valve stem through its various packing glands or stuffing-boxes obtained by having those positions of the valve stem which move within the packed glands constructed of minimum circumference, so that frictional forces may be reduced to a minimum. In connection with its application to control of flue gas discharge through a stack, the valve provides simplicity and economy of operation and reduced construction costs.

We claim:

1. In a fluidized catalyst conversion system in which fluids are contacted with erosive entrained solids at high temperatures within a large contacting chamber, and in which said fluids, containing erosive entrained solids, are flowed from said chamber into the inlet of a conduit together with a second fluid introduced into said conduit from an external source, a unitary removable valve assembly for controlling the flow of solids from said chamber into said conduit and for simultaneously introducing fluid into said conduit, which includes: a housing adapted to be demountably attached to the external surfaces of said chamber and aligned with said conduit inlet, said housing having an internal section projecting into the high temperature region within said chamber and an external section projecting outside of said chamber; a hollow-stem plug valve reciprocable in said internal section of said housing and adapted to enter said conduit inlet and having said hollow-stem in open communication with the interior of said conduit through an orifice in the plug end; packing means in the lower part of the external section of said housing; actuating rod means constituting an extension of said hollow-stem valve means and connected to said hollow-stem valve and reciprocable in said packing along an axial path, said actuating rod means having a cross-section substantially less than the cross-section of said hollow-stem portion of said hollow-stem valve means, and substantially less than the interior cross-section of said housing to provide an annular space within the external section of said housing, said annular space being in open communication with said hollow-stem; coupling means on said external portion of said housing adapted to be connected to said external source of said second fluid for introduction into said conduit by way of said annular space, said hollow-stem, and said orifice in said plug valve; positioning means in cooperative engagement with said actuating rod means to regulate the position of said hollow-stem valve along its path of movement; and a spring connection securing said positioning means to said external portion of said housing, said positioning means being moveable as a unit with said hollow-stem and its extension away from said tubular housing along said axial path against the action of said spring upon the application of downward forces against said valve means in excess of predetermined maximum.

2. In a fluidized catalyst conversion system in which a finely divided solid catalyst at elevated temperature is continuously circulated between reaction and regenerating steps in separate reaction and regeneration chambers by means of a transfer fluid, one superimposed above the other, means for controlling the circulating flow of solids between said chambers which includes: a downflow conduit and an upflow conduit extending downwardly from said upper chamber into said lower region of said lower chamber and providing communication between said upper and lower chambers, and terminating at their lower ends in valve seats; a pair of valve housings demountably attached to the exterior of the bottom of said lower chamber, each of said valve housings being provided with a portion projecting upwardly into said lower chamber and provided with an internal passage in alignment with said valve seats; a pair of plug valves vertically reciprocable in said valve housings and adapted to seat on said valve seats of said downflow and upflow conduits respectively, said upflow conduit plug valve being provided with a hollow-stem passage terminating at its upper end in a nozzle opening into the interior of said upflow conduit; means for introducing said transfer fluid into the hollow-stem of said reciprocable plug valve for introduction into said upflow conduit by way of said nozzle opening in the upper end of said plug valve; actuating rod means connected to said hollow-stem below said transfer fluid introducing means and of a cross-section substantially less than the cross-section of said hollow-stem; and packing means surrounding a portion of the length of said actuating rod means to permit said actuating rod means and said hollow-stem to reciprocate within their housing.

3. In a fluidized catalyst conversion system in which fluids are contacted with erosive entrained solids at high temperatures within a large contacting chamber, and in which said fluids, containing erosive entrained solids, are flowed from said chamber into the inlet of a conduit together with a second fluid introduced into said conduit from an external source, a unitary removable valve assembly for controlling the flow of solids from said chamber into said conduit and for simultaneously introducing fluid into said conduit, which includes: a housing adapted to be demountably attached to the external surfaces of said chamber and aligned with said conduit inlet, said housing having an integral section projecting into the high temperature region within said chamber and an external section projecting outside of said chamber; a hollow-stem plug valve reciprocable in said internal section of said housing and adapted to enter said conduit inlet and having said hollow-stem in open communication with the interior of said conduit through an orifice in the plug end; packing means in the lower part of the external section of said housing; actuating rod means connected to said hollow-stem valve and reciprocable in said packing, said actuating rod means having a cross-section substantially less than the cross-section of said hollow-stem portion of said hollow-stem valve means, and substantially less than the interior cross-section of said housing to provide an annular space within the external section of said housing, said annular space being in open communication with said hollow-stem; coupling means on said external portion of said housing adapted to be connected to said external source of said second fluid for introduction into said conduit by way of said annular space, said hollow-stem, and said orifice in said plug valve; and positioning means in cooperative engagement with said actuating rod means to regulate the position of said hollow-stem valve along its path of movement.

HAROLD KERSHAW.
EDWARD D. DOWLING.

References Cited in the file of this patent

UNITED STATES PATENTS

| Number | Name | Date |
| --- | --- | --- |
| 477,372 | Kennedy | June 21, 1892 |
| 1,319,193 | Von Porat | Oct. 21, 1919 |
| 1,658,292 | Kniskern | Feb. 7, 1928 |
| 1,679,218 | Huff | July 31, 1928 |
| 2,030,771 | Still | Feb. 11, 1936 |
| 2,074,091 | McKinnon | Mar. 16, 1937 |
| 2,332,419 | White | Oct. 19, 1943 |
| 2,433,726 | Angell | Dec. 30, 1947 |
| 2,457,232 | Hengstebeck | Dec. 28, 1948 |
| 2,488,033 | Johnson | Nov. 15, 1949 |

FOREIGN PATENTS

| Number | Country | Date |
| --- | --- | --- |
| 22,349 | Great Britain | 1900 |